United States Patent
Zhang et al.

(10) Patent No.: US 10,469,178 B2
(45) Date of Patent: Nov. 5, 2019

(54) METHODS AND APPARATUS FOR PROVIDING MEASUREMENT INFORMATION

(75) Inventors: Yi Zhang, Beijing (CN); Benoist Pierre Sebire, Tokyo (JP); Guillaume Decarreau, Beijing (CN)

(73) Assignee: Nokia Solutions and Networks Oy, Espoo (FI)

( * ) Notice: Subject to any disclaimer, the term of this patent is extended or adjusted under 35 U.S.C. 154(b) by 94 days.

(21) Appl. No.: 14/239,834

(22) PCT Filed: Aug. 22, 2011

(86) PCT No.: PCT/CN2011/078703
§ 371 (c)(1),
(2), (4) Date: Feb. 20, 2014

(87) PCT Pub. No.: WO2013/026192
PCT Pub. Date: Feb. 28, 2013

(65) Prior Publication Data
US 2014/0206294 A1    Jul. 24, 2014

(51) Int. Cl.
*H04B 15/00* (2006.01)
*H04W 72/12* (2009.01)
*H04W 24/08* (2009.01)
*H04W 24/10* (2009.01)
*H04W 88/06* (2009.01)

(52) U.S. Cl.
CPC ............ *H04B 15/00* (2013.01); *H04W 24/08* (2013.01); *H04W 24/10* (2013.01); *H04W 72/1215* (2013.01); *H04W 88/06* (2013.01)

(58) Field of Classification Search
CPC ...... H04B 15/00; H04B 1/1027; H04B 1/525; H04B 1/406; H04W 88/06; H04W 16/14; H04W 72/1215; H04W 72/1284; H04W 24/10; H04W 76/027
See application file for complete search history.

(56) References Cited

U.S. PATENT DOCUMENTS

| | | | |
|---|---|---|---|
| 2006/0292987 A1 | 12/2006 | Ophir et al. | 455/41.2 |
| 2009/0186609 A1 | 7/2009 | Wu et al. | 455/424 |
| 2011/0158123 A1* | 6/2011 | Kim | H04L 1/0026 370/252 |
| 2011/0243047 A1* | 10/2011 | Dayal et al. | 370/311 |
| 2011/0250880 A1* | 10/2011 | Olsson | 455/423 |
| 2011/0312306 A1* | 12/2011 | Wu | 455/414.1 |

(Continued)

FOREIGN PATENT DOCUMENTS

| | | |
|---|---|---|
| CN | 101174851 A | 5/2008 |
| CN | 101998463 A | 3/2011 |

(Continued)

OTHER PUBLICATIONS

NPL search report, Google, 2011 (Year: 2011).*

(Continued)

*Primary Examiner* — Jianxun Yang
(74) *Attorney, Agent, or Firm* — Harrington & Smith (57) ABSTRACT

A method including determining if there is in device co-existence interference during operation of the device; and causing information about in device co-existence interference and information about measurements performed by the device to be transmitted to a base station.

16 Claims, 5 Drawing Sheets

(56) References Cited

U.S. PATENT DOCUMENTS

2012/0040715 A1* 2/2012 Fu et al. .................. 455/553.1
2013/0028201 A1* 1/2013 Koo et al. .................. 370/329

FOREIGN PATENT DOCUMENTS

| CN | 102143521 A | 8/2011 |
|---|---|---|
| CN | 102158869 A | 8/2011 |

OTHER PUBLICATIONS

3GPP TR 36.816 V11.0.0 (Jun. 2011); 3rd Generation Partnership Project; Technical Specification Group Radio Access Network; Evolved Universal Terrestrial Radio Access (E-UTRA); Study on signalling and procedure for interference avoidance for in-device coexistence (Release 11).

3GPP TS 37.320 V10.0.0 (Dec. 2010); 3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10).

Tdoc R2-105743; Ericsson, ST-Ericsson; "Methods for in-device coexistence interference avoidance"; 3GPP TSG-RAN WG2 #71bis; Xian, China Oct. 11-15, 2010.

R2-110243; ZTE; "Considerations on the detail procedure for FDM approach"; 3GPP TSG-RAN WG2 Meeting #72bis; Jan. 17-21, 2011, Dublin, Ireland.

R2-112248; Motorola Mobility; "Triggering of Actions related to In-device Coexistence"; 3GPP TSG-RAN WG2#73bis; Shanghai, China, Apr. 11-15, 2011.

R2-114486; Fujitsu; "Clarification on the indication"; 3GPP TSG-RAN WG2 Meeting #75; Athens, Greece, Aug. 22-26, 2011.

\* cited by examiner

METHODS AND APPARATUS FOR PROVIDING MEASUREMENT INFORMATION

Some embodiments relate to methods and apparatus and in particular but not exclusively to methods and apparatus for the reporting of measurement information.

Communication between two or more entities such as mobile communication devices and other stations can be facilitated by a communication system. A communication system and compatible communication devices typically operate in accordance with a given standard or specification which sets out what the various entities associated with the system are permitted to do and how that should be achieved. For example, the manner how the communication device can access the communication system and how communications shall be implemented between communicating devices, the elements of the communication network and/or other communication devices is typically defined.

In a wireless communication system at least a part of communications between at least two stations occurs over a wireless link. In wireless systems a communication device thus typically provides a transceiver station that can communicate with the access node and/or another communications device. Examples of wireless systems include public land mobile networks (PLMN), satellite based communication systems and different wireless local networks, for example wireless local area networks (WLAN). In wireless systems an access node is provided by a base station. The radio coverage area of a base station is known as a cell, and therefore the wireless systems are often referred to as cellular systems. In some systems a base station access node is called Node B.

A communication system can be accessed by means of an appropriate communication device. A communication device of a user is often referred to as user equipment (UE). A communication device is provided with an appropriate signal receiving and transmitting arrangement for enabling communications with other parties. A feature of wireless communication devices is that they offer mobility for the users thereof. A mobile communication device, or mobile device for short, may also be transferred, or handed over, from a base station to another and even between base stations belonging to different systems.

The communication devices or user equipment may make measurements which are reported to the base station. These measurements may be used to monitor network performance.

According to a first aspect, there is provided a method comprising determining if there is in device co-existence interference during operation of said device; and causing information about in device co-existence interference and information about measurements performed by said device to be transmitted to a base station.

According to another aspect, there is provided a method comprising receiving information about in device co-existence interference and information about measurements performed by said device; and processing said information about said measurements in dependence on said information about in device co-existence interference.

According to a further aspect, there is provided an apparatus comprising means for determining if there is in device co-existence interference during operation of said device; and means for causing information about in device co-existence interference and information about measurements performed by said device to be transmitted to a base station.

According to a further aspect, there is provided an apparatus comprising means for receiving information about in device co-existence interference and information about measurements performed by said device; and means for processing said information about said measurements in dependence on said information about in device co-existence interference.

Some embodiments will now be described, by way of example only, with reference to the following examples and accompanying drawings in which.

In the following certain exemplifying embodiments are explained with reference to wireless or mobile communication systems serving mobile communication devices. Before explaining in detail the certain exemplifying embodiments, certain general principles of a wireless communication system and the nodes thereof are briefly explained with reference to FIGS. 1 to 4 to assist in understanding of the herein described embodiments.

Figure 1:
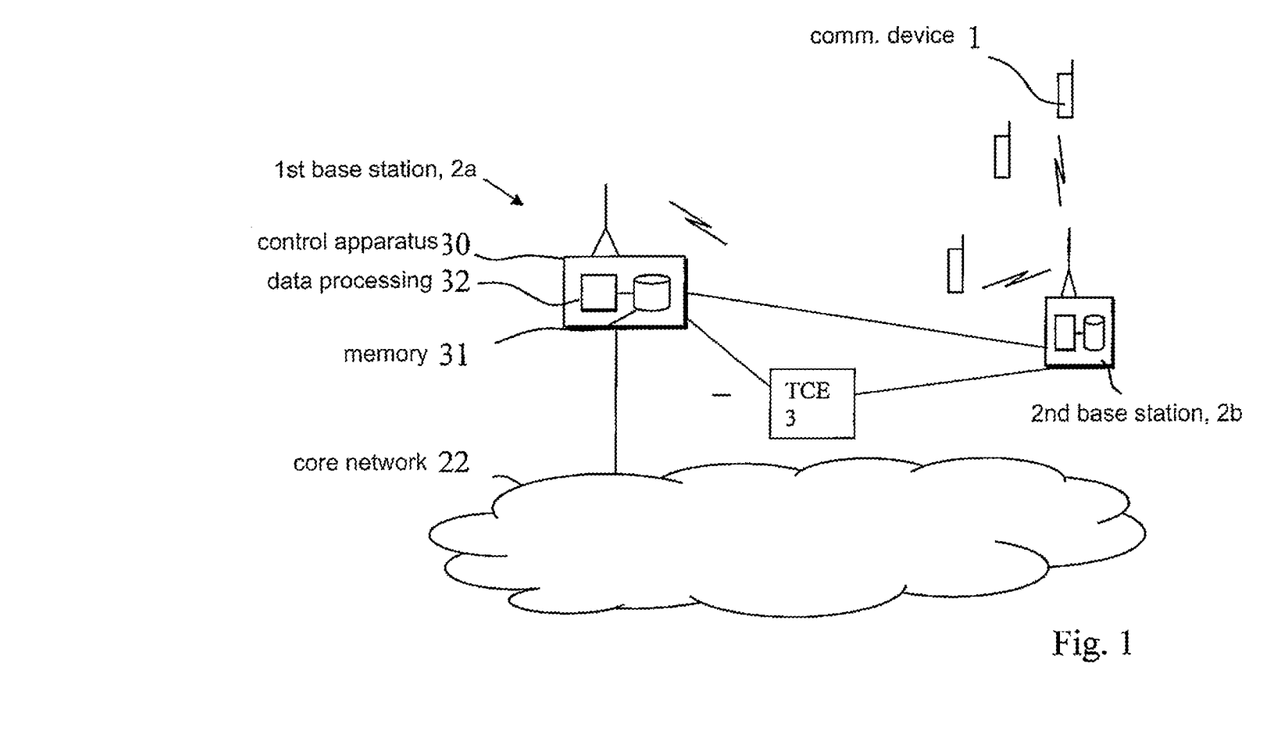
FIG. 1 shows an example of a communication system in which some embodiments may be implemented.

In a mobile system a user can be provided with a mobile communication device 1 that can be used for accessing various services and/or applications. The access can be provided via an access interface between the mobile user device 1 and an appropriate wireless access system, for example an access node. An access node can be provided by a base station. FIG. 1 shows part of a radio access network (RAN), including a first base station 2a and a second base station 2b. The term base station will be used in the following and is intended to include the use of any of these access nodes or any other suitable access node. The base stations each have a cell associated therewith. The base stations can be connected, for example, by means of a X2 interface.

A TCE (Trace Control Element) 3 is provided. The TCE is arranged to receive MDT (Minimizing drive tests) measurement reports from the eNB.

Although not shown, a gateway function between the access systems, a core network 22 and/or another network such as the packet data network may also be provided by means of appropriate gateway nodes. Regardless of the gateway arrangement, a communication device can be connected to an external data network, for example the internet via the access nodes and the base station.

The mobile communication devices can access the communication system based on various access techniques, such as code division multiple access (CDMA), or wideband CDMA (WCDMA), the latter technique being used by some communication systems based on the third Generation Partnership Project (3GPP) specifications. For LTE (long term evolution) and LTE-A (long term, evolution—advanced), OFDMA (Orthogonal Frequency Division Multiplexing) in the DL (down link) and single-carrier FDMA in the UL (uplink) can be used. Other examples include time division multiple access (TDMA), frequency division multiple access (FDMA), space division multiple access (SDMA)

and so on. In a wireless system a network entity such as a base station provides an access node for communication devices.

A non-limiting example of mobile architectures where the herein described principles may be applied is known as the Evolved Universal Terrestrial Radio Access Network (E-UTRAN). Non-limiting examples of appropriate access nodes are a base station of such system, for example what is known as NodeB (NB) or enhanced NodeB (eNB) in the vocabulary of the 3GPP specifications. Other examples include base stations of systems that are based on technologies such as wireless local area network (WLAN) and/or WiMax (Worldwide Interoperability for Microwave Access). Access nodes can provide cellular system level base stations providing E-UTRAN features such as user plane Radio Link Control/Medium Access Control/Physical layer protocol (RLC/MAC/PHY) and control plane Radio Resource Control (RRC) protocol terminations towards mobile communication devices.

Regardless of the underlying standard, a mobile communication device can be provided wireless access via at least one base station or similar wireless transceiver node of an access system. An access system may be provided by a cell of a cellular system or another radio service area enabling a communication device to access a communication system. Therefore an access system is hereinafter referred to as a radio service area or cell. Typically a cell is provided by a base station site. A base station site can provide a plurality of sectors, for example three radio sectors, each sector providing a cell or a sub radio service area of a cell.

Figure 2:
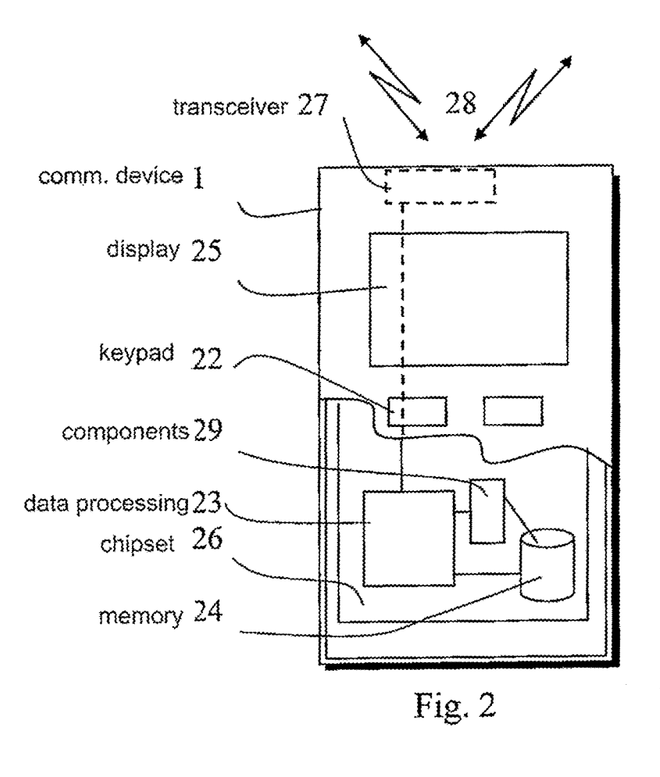
FIG. 2 shows an example of a communication device.

FIG. 2 shows a schematic, partially sectioned view of a communication device 1 that a user can use for communication. Such a communication device is often referred to as user equipment (UE) or terminal. An appropriate communication device may be provided by any device capable of sending and receiving radio signals, mobile or stationary. Non-limiting examples include a mobile station (MS) such as a mobile phone or what is known as a 'smart phone', a portable computer provided with a wireless interface card or other wireless interface facility, personal data assistant (PDA) provided with wireless communication capabilities, or any combinations of these or the like. A communication device may provide, for example, communication of data for carrying communications such as voice, electronic mail (email), text message, multimedia and so on. Users may thus be offered and provided numerous services via their communication devices. Non-limiting examples of these services include two-way or multi-way calls, data communication or multimedia services or simply an access to a data communications network system, such as the Internet. User may also be provided broadcast or multicast data. Non-limiting examples of the content include downloads, television and radio programs, videos, advertisements, various alerts and other information.

The communication device 1 may receive and transmit signals over an air interface 28 via appropriate apparatus for receiving and transmitting signals. In FIG. 2 transceiver apparatus is designated schematically by block 27. The transceiver may be provided for example by means of a radio part and associated antenna arrangement. The antenna arrangement may be arranged internally or externally to the mobile device.

A communication device is also typically provided with at least one data processing entity 23, at least one memory 24 and other possible components 29 for use in software and hardware aided execution of tasks it is designed to perform, including control of access to and communication with base stations and other communication devices. The data processing, storage and other relevant control apparatus can be provided on an appropriate circuit board and/or in chipsets. This feature is denoted by reference 26. Possible control functions in view of configuring the communication device for reception and/or transmission of signalling information and data by means of the data processing facility in accordance with certain embodiments will be described later in this description.

The user may control the operation of a communication device by means of a suitable user interface such as keypad 22, voice commands, touch sensitive screen or pad, combinations thereof or the like. A display 25, a speaker and a microphone are also typically provided. Furthermore, a communication device may comprise appropriate connectors (either wired or wireless) to other devices and/or for connecting external accessories, for example hands-free equipment, thereto.

Figure 3:
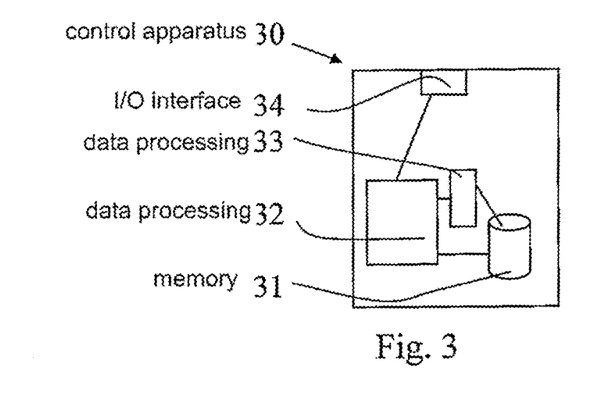
FIG. 3 shows an example of a controller apparatus for a base station.

FIG. 3 shows an example of a control apparatus 30, for example to be coupled to a base station and/or part of the base station itself. The control apparatus 30 can be arranged to provide control on use of resources for communications by communication devices that are in the service area. The control apparatus 30 can be configured to provide control functions in association with generation and communication of resource allocation information and other related information and for coordination of resource allocation for signalling and data communications by means of the data processing facility in accordance with certain embodiments described below. For this purpose the control apparatus 30 comprises at least one memory 31, at least one data processing unit 32, 33 and an input/output interface 34. Via the interface the control apparatus can be coupled to receiver and transmitter apparatus of a base station. The control apparatus 30 can be configured to execute an appropriate software code to provide the control functions.

Figure 4:
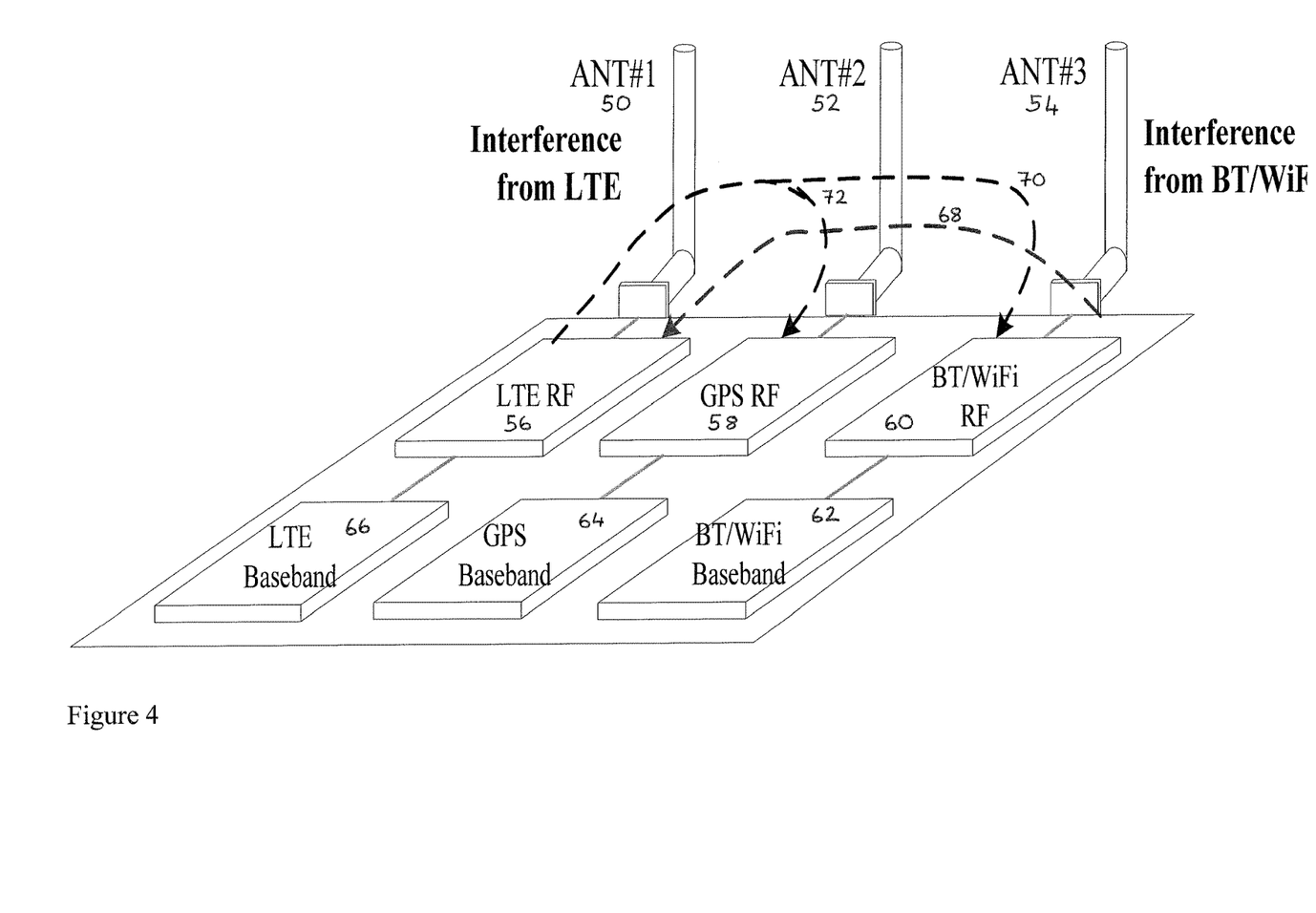
FIG. 4 shows a communication device with three transceivers.

Reference is made to FIG. 4 which shows part of the device 1 in more detail. In this example, the device 1 has a first antenna 50, a second antenna 52 and a third antenna 54. The first antenna 50 is configured to transmit and receive LTE signals. The second antenna 52 is configured to receive GPS (global positioning system) signals. The third antenna 54 is configured to transmit and receive Bluetooth and/or Wi-Fi signals. These latter signals are referred to as ISM (industrial, scientific and medical) signals. This is in order to allow the device to access various networks and services.

The first antenna 50 is connected to an LTE radio frequency processor 56 which is arranged to process the radio frequency signals. The LTE radio frequency processor 56 is coupled to an LTE baseband processor 66 which is arranged to process the radio frequency signals to convert those signals to the baseband and to process those signals. Similarly, the second antenna 52 is coupled to a GPS radio frequency processor 58, which is arranged to be coupled to the GPS baseband processor 64. Finally, the third antenna 54 is connected to a Bluetooth/Wi-Fi radio frequency processor 60 which in turn is connected to the Bluetooth/Wi-Fi baseband processor 62. It should be appreciated that when the respective antenna receives a radio frequency signal, that radio frequency signal is provided to the respective radio frequency processor. The radio frequency processor may carry out any suitable processes, for example, filtering the desired signal from the undesired signals and/or amplification. The processed radio frequency signal is then provided to the respective baseband processor for down-conversion to the baseband and further processing.

In the case of transmission, the baseband processors will receive the signals at the baseband and up-convert those signals to the radio frequency. Other processing may be carried out by the baseband processors. Those radio frequency signals are then passed to the respective radio frequency processor.

The processing carried out by the respective blocks can be performed by a single block or processor, or by more than two blocks or processors. The division of the processes between the blocks can of course be changed. For example, the RF processing block may, for example, in some embodiments perform the baseband conversion, at least one of converting down to the baseband or up-converting to the radio frequency. Separate processors and/or antennas may be provided in some embodiments for uplink and downlink. In some embodiments, at least one processor may be used for two or more different types of signal received from and/or to be transmitted by two or more antennas.

It should be appreciated that in some embodiments, the GPS blocks may only need to receive signals.

It is possible that when LTE and ISM (which includes Bluetooth and WLAN technology) capabilities are provided in a single device, the LTE and ISM radio within the same device may be working on adjacent frequencies. For example, the LTE may be working on the upper part of band 40 (2300-2400 MHz) and the ISM may be working in the example 2450 MHz band. This type of coexistence may cause interference. This interference between the LTE frequencies and the Bluetooth/Wi-Fi frequencies is schematically shown in FIG. 4 by arrows 68 and 70.

With the rapid increase in the number and types of GPS systems, such as GPS, A-GPS (assisted global navigation satellite system) and COMPASS, the spectrum allocation to the services is increasing. When LTE and GPS radio capabilities are provided within the same device, this may cause interference due to the adjacent operation or harmonics. The interference between the LTE and GPS systems is schematically shown by arrow 72 in FIG. 4.

Some embodiments may be implemented in an LTE system, for example the LTE-A system. Of course other embodiments may be used with other releases of the LTE standard. Yet further embodiments may be used with the standards other than the LTE standard.

Minimizing drive tests (MDT) has been proposed in 3GPP RAN Working Groups. In some embodiments, automatic collection of UE measurements may be defined. In some embodiments, this may enable easier monitoring of network performance and may replace expensive drive-tests performed by operators manually. This functionality requires relevant input from the terminal or UE.

In 3GPP Rel.10 two MDT reporting approaches have been specified. One approach is Immediate MDT reporting. Immediate MDT reporting means that a UE needs to report MDT measurements immediately to a base station/radio network controller right after MDT measurement has been made, which is following the measurement configuration and reporting for RRM (radio resource management) purposes.

Another approach is Logged MDT reporting. Logged MDT reporting means a UE gets the Logged MDT configuration when it is in connected mode. After the UE goes to idle mode it will log the measurements using the idle mode measurement mechanism. The UE will report these measurement logs to the network when the UE connects again to the network. The idle mode occurs when the UE is switched on and not actively connected to the network. An active connection occurs, for example, when the UE is on a call or has an active data connection to, for example, the Internet.

The measurements made by the UE relate to the serving cell and possible neighboring cells. These measurements may be of any suitable parameter such as signal strength of the respective cell as received at the UE. The signal strength of a reference signal, for example a pilot signal, may be measured. Alternatively or additionally interference information may be determined by the UE. The UE may be arranged to provide one or more types of measurement information for one or more cells.

A UE may only performs the serving cell measurements if a serving cell signal is good enough, otherwise the UE may perform intra/inter-frequency and inter-RAT (radio access technology) measurements that are given in system information. This may be the case for Logged MDT reporting.

As described above more and more UEs are equipped with multiple radio transceivers in order to allow users to access various networks and services ubiquitously. One resulting challenge lies in trying to avoid coexistence interference between those collocated radio transceivers as discussed in relation to FIG. 4. Consequently, In Device Coexistence (IDC) is being considered in 3GPP Rel. 10 for interference avoidance in case several radio transceivers coexist in one device.

For example ISM band UL may interfere with LTE DL reception. LTE network-controlled UE-assisted solutions may be used, for example at initiation a UE can send some information to the network to report the coexistence problems. One proposal is to send the usable/non-usable frequency bands in case FDM solution is used or TDM mode in case TDM solution is used.

In ISM band UL interfering with LTE DL reception scenario, the LTE measurements have been 'polluted' by the interference from ISM band and the measurement results of RSRP/RSPQ (reference signal received power/reference signal received quality) may not reflect the real situation of the network coverage. This may lead to the incorrect network performance evaluation which may be disadvantageous.

The inventors have appreciated that in the IDC scenario, for example in cases of 'On-going interference on the serving frequency' and 'On-going interference on non-serving frequencies', the application of MDT in the network should be considered.

It has been suggested that new measurements be made for the purposes of IDC. For example the UE does the measurements in the non-interference periods and thus the UE may get a 'clean' measurement. As a result UE may get two measurements, one is the 'clean' measurement without IDC interference and the other one is the existing 'polluted' measurement with IDC interference. If that occurs, there is no impact to eNB, i.e. UE always reports the 'clean' measurement to the base station. However this approach might add complexity to UE implementation, and require new definitions on test cases, measurement configuration and report configuration. It may be that the 'clean' measurement is not helpful to base station to alleviate the IDC problems.

Figure 5:
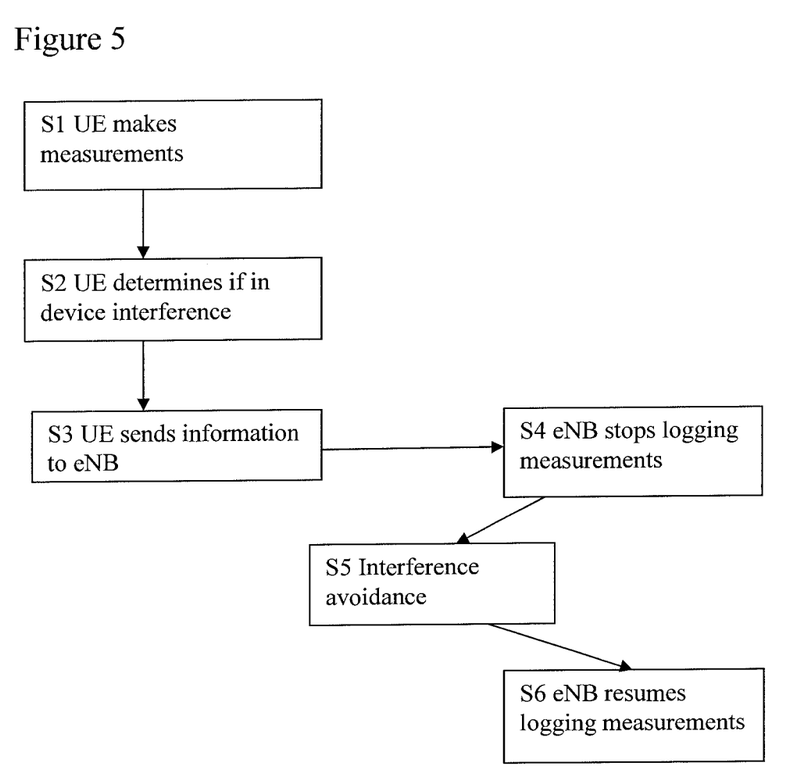
FIG. 5 shows a flow diagram of a method using immediate reporting.

Reference is made to FIG. 5 which shows a method of an embodiment using immediate MDT. The method may be used, in case of 'On-going interference on the serving frequency'.

In step S1, the UE makes the required MDT measurements.

In step S2, the UE will make a determination that there is a potential interference issue. This can be done from the user equipment checking if there is interference between ISM and LTE. In one embodiment, the user equipment will determine that there is an interference problem, only if the respective interfering receivers are both switched on. In alternative embodiments, a determination is made regardless as to whether or not the respective functionality is turned on or off. Alternatively or additionally, the user equipment may perform quality of service measurements with respect to received signals in order to determine if any of the transmitting signals are potentially causing interference.

It should be appreciated that the order of steps S1 and S2 may be reversed. Alternatively the steps may be carried out generally at the same time.

In step S3, the UE shall send an indication 'experiencing IDC interference' to eNB.

In step S4, after receiving this indication, eNB may choose to stop putting the collected measurements into the trace files for MDT purposes.

In step S5, some interference avoidance action may be taken by the UE and/or the eNB. For example, where a FDM solution is applied by the eNB, the UE may be handed-over to a new frequency where there is no IDC interference existing. This new frequency may be of a different (target) eNB than the source eNB. Another example, where a TDM solution is applied by the eNB, LTE and ISM band use different transmission/receiving periods, which eliminates the interference.

In step S6, regardless of whether a FDM or TDM approach is used, the eNB with which UE is connected may wait for a predefined time duration. Upon the expiration of this timer, if there is no more 'experiencing IDC interference' indication received from UE, the eNB resumes putting the received measurements into the trace files for MDT purposes.

Additionally or alternatively, if no interference avoidance action is applied, e.g. UE doesn't receive any suggestion for IDC from the eNB, the UE sends an indication 'no IDC interference' to the eNB after the UE detects that the IDC interference is no longer present. After receiving this indication, eNB shall resume putting the measurements into the trace files for MDT purpose. In one embodiment, these steps may be additional to one or more of the steps of FIG. 5. Alternatively these steps may replace steps S5 and/or step S6.

In the above, the START and/or END of IDC interference is indicated. Alternatively or additionally, the IDC interference status could be appended to each measurement report or each transmission, or only the interfered measurement report are appended with the IDC interference status. The eNB may make the decision whether to put the measurements into trace files for MDT purpose according to the appended IDC interference status.

Figure 6:
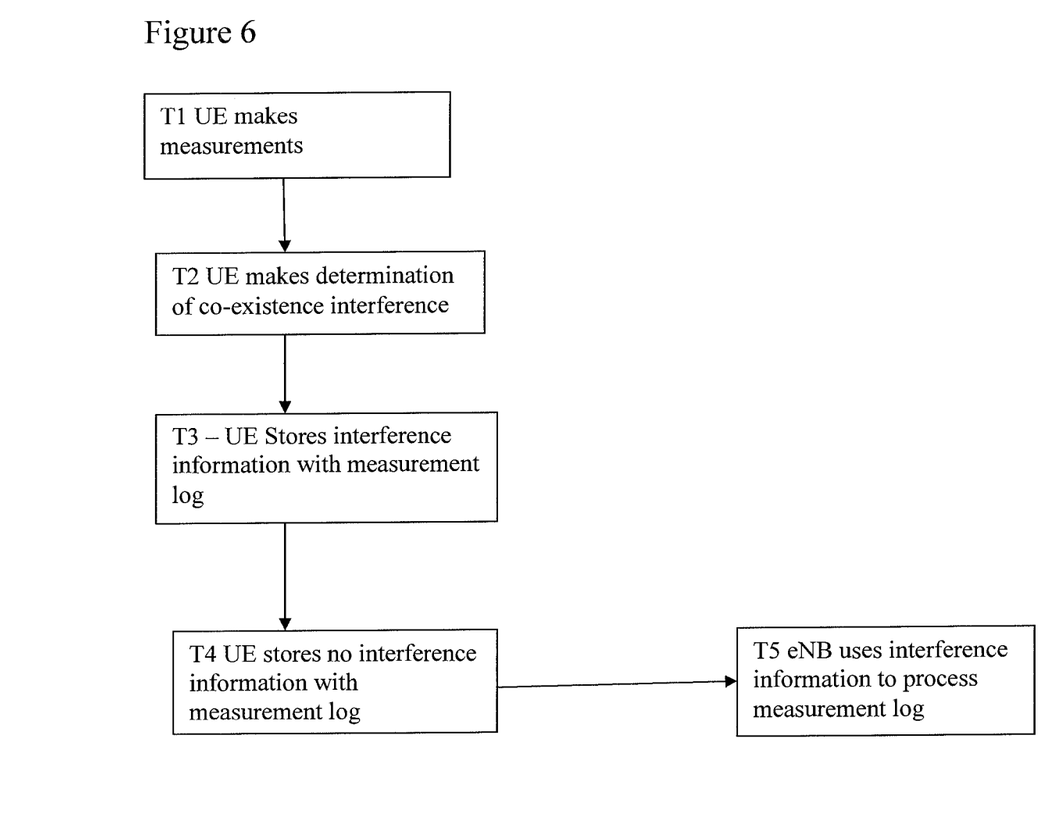
FIG. 6 shows a flow diagram of a method using logged reporting.

Reference is made to FIG. 6 which shows a method of an embodiment using logged MDT. The method may be used, in case of 'On-going interference on the serving frequency'.

Steps T1 and T2 may be as described with reference to Steps S1 and S2 in relation to FIG. 5.

In step T3, once the IDC interference is detected, the UE shall provides a START mark to indicate 'starting to experience IDC interference' together with the first log which is affected by IDC interference.

In step T4, once the UE detects that the IDC interference has disappeared, the UE shall provide an END mark to indicate "no IDC interference" together with the last log which is affected by the IDC interference.

In step T5, when the Logged MDT report is sent to the eNB, the eNB may choose to ignore the measurements marked as suffering from IDC interference.

Alternatively or additionally for each logged measurement, IDC interference status can be appended, or only the interfered measurement logs are appended with the IDC interference status.

In one alternative to step T3 to T5, a UE stops logging the measurement when the UE detects the IDC interference and resumes logging once upon it detects the interference disappears.

In some embodiments any information sent by UE to eNB to avoid the IDC may be used as an indication of 'experiencing IDC interference'.

In some embodiments, the UE may indicate in the context of existing MDT measurements reported to the network that it is suffering in-device interference. In some embodiments, information about in-device interference may be;
appended to each measurement;
included in a log;
provided when interference begins and/or ends; and/or
periodically reported.

In some embodiments, the UE tags the measurement results with an indication whether it has experienced in-device interference on the measured band at the time of the measurement. Based on detection of in-device coexistence (IDC) interference, MDT-related data is filtered in order to avoid capturing data that is corrupted by the IDC interference. The detection and filtering can be performed by the UE, or the detection can be performed by the UE and the filtering performed by the eNB.

Thus in some embodiments, an indication can be provided in the context of MDT measurement reporting that the terminal is suffering from in-device interference, which can be taken into account while processing the measurements.

It should be appreciated that the interference scenarios give are by way of example and there may be additional and/or alternative interference scenarios between the different radio technologies.

The above embodiments have discussed ISM/LTE interference. Alternative embodiments may deal with other cases of in device coexistence.

It should be noted that different embodiments have been described. It should be appreciated that two or more embodiments or parts of two or more embodiments may be combined.

One or more of the steps performed by the apparatus of the base station and/or apparatus of the UE may be performed when one or more associated instructions are run on one or more of the processors. It should be appreciated that the one or more associated instructions may be stored in one or more memories of the base station.

Whilst embodiments have been described in relation to the LTE systems, it should be appreciated that embodiments can be used in conjunction with any other suitable standard. For example, embodiments may be used in a UMTS environment. In this alternative, the messages may be UMTS messages.

It is noted that whilst embodiments may have been described in relation to user equipment or communication devices such as mobile terminals, embodiments may be applicable to any other suitable type of apparatus suitable for communication via access systems. A mobile device may be configured to enable use of different access technologies, for example, based on an appropriate multi-radio implementation.

It is also noted that although certain embodiments may have been described above by way of example with reference to the exemplifying architectures of certain mobile networks and a wireless local area network, embodiments may be applied to any other suitable forms of communication systems than those illustrated and described herein. It is also noted that the term access system may be understood to refer to any access system configured for enabling wireless communication for user accessing applications.

The above described operations may require data processing in the various entities. The data processing may be provided by means of one or more data processors. Similarly various entities described in the above embodiments may be implemented within a single or a plurality of data processing entities and/or data processors. The data processing entities may be controlled by one or more computer programs which may be stored in one or more memories of the apparatus.

Alternatively or additionally appropriately adapted computer program code product may be used for implementing the embodiments, when loaded to a computer or a processor. The program code product for providing the operation may be stored on and provided by means of a carrier medium such as a carrier disc, card or tape. In some embodiments, there may be the possibility to download the program code product via a data network.

Some embodiments may be implemented as a chipset, in other words a series of integrated circuits communicating among each other. The chipset may comprise microprocessors arranged to run code, application specific integrated circuits (ASICs), and/or programmable digital signal processors for performing the operations described above.

Embodiments may be practiced in various components such as integrated circuit modules.

The foregoing description has provided by way of exemplary and non-limiting examples a full and informative description of the exemplary embodiments. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

What is claimed is:

1. A method comprising:
   performing minimizing-drive-test measurements;
   logging said minimizing-drive-test measurements;
   determining whether in-device co-existence interference occurs during performance of said minimizing-drive-test measurements; and
   transmitting the logged minimizing-drive-test measurements to a base station with information whether in-device co-existence interference occurred during the performance of said minimizing-drive-test measurements,
   wherein, when in-device co-existence interference occurs, the logging of minimizing-drive-test measurements is stopped, and, when in-device co-existence interference no longer occurs, the logging of minimizing-drive-test measurements is resumed.

2. The method as claimed in claim 1, wherein the logged minimizing-drive-test measurements are transmitted to the base station together with the information whether in-device co-existence interference occurred.

3. The method as claimed in claim 1, wherein said information is transmitted in response to in-device co-existence interference starting or in response to in-device co-existence interference stopping.

4. The method as claimed in claim 1, wherein said information includes further information for avoiding in-device co-existence interference.

5. The method as claimed in claim 1, wherein said minimizing-drive-test measurements are transmitted after a connection with the base station is established.

6. The method as claimed in claim 1, wherein the minimizing-drive-test measurements and the information whether in-device co-existence interference occurred are reported in a measurement log.

7. The method according to claim 1 implemented by a computer running computer executable instructions stored on a non-transitory computer-readable medium.

8. A method comprising:
   receiving minimizing-drive-test measurements performed by a device and information whether the device was experiencing in-device co-existence interference while performing the minimizing-drive-test measurements; and
   processing the minimizing-drive-test measurements based on said information whether the device was experiencing in-device co-existence interference while the minimizing-drive-test measurements were being performed,
   wherein, when said information indicates that the device was experiencing in-device co-existence interference, said minimizing-drive-test measurements are not sent to a trace file for minimizing-drive-test measurements, and, when said information indicates that the device was not experiencing in-device co-existence interference, said minimizing-drive-test measurements are sent to said trace file for minimizing-drive-test measurements.

9. The method as claimed in claim 8, further comprising, when first information indicating a presence of in-device co-existence interference is received and when no second information indicating the presence of in-device co-existence interference is received within a given period of time after receiving the first information, determining that the device is no longer experiencing in-device co-existence interference.

10. The method according to claim 8 implemented by a computer running computer executable instructions stored on a non-transitory computer-readable medium.

11. An apparatus comprising:
   at least one processor; and
   at least one memory including computer program code, the at least one memory and the computer program code being configured, with the at least one processor, to cause the apparatus to perform at least the following:
   performing minimizing-drive-test measurements;
   logging said minimizing-drive-test measurements;
   determining whether in-device co-existence interference occurs during performance of said minimizing-drive-test measurements; and
   transmitting the logged minimizing-drive-test measurements to a base station with information whether in-device co-existence interference occurred during the performance of said minimizing-drive-test measurements,
   wherein, when in-device co-existence interference occurs, the logging of minimizing-drive-test measurements is stopped, and, when in-device co-existence interference no longer occurs, the logging of minimizing-drive-test measurements is resumed.

12. The apparatus as claimed in claim 11, wherein the at least one memory and the computer program code are further configured, with the at least one processor, to cause the apparatus to transmit to the base station the logged minimizing-drive-test measurements together with the information whether in-device co-existence interference occurred.

13. The apparatus as claimed in claim 11, wherein the at least one memory and the computer program code are further configured, with the at least one processor, to cause the apparatus to transmit said information in response to in-device co-existence interference starting or in response to in-device co-existence interference stopping.

14. The apparatus as claimed in claim 11, wherein the minimizing-drive-test measurements and the information whether in-device co-existence interference occurred is transmitted to the base station in a measurement log wherein said information about in-device co-existence interference is associated with the minimizing-drive-test measurements.

15. An apparatus comprising:
 at least one processor; and
 at least one memory including computer program code, the at least one memory and the computer program code being configured, with the at least one processor, to cause the apparatus to perform at least the following:
 receiving minimizing-drive-test measurements performed by a device and information whether the device was experiencing in-device co-existence interference while performing the minimizing-drive-test measurements; and
 processing the minimizing-drive-test measurements based on said information whether the device was experiencing in-device co-existence interference while the minimizing-drive-test measurements were being performed,
 wherein, when said information indicates that the device was experiencing in-device co-existence interference, said minimizing-drive-test measurements are not sent to a trace file for minimizing-drive-test measurements, and, when said information indicates that the device was not experiencing in-device co-existence interference, said minimizing-drive-test measurements are sent to said trace file for minimizing-drive-test measurements.

16. The apparatus as claimed in claim 15, wherein the at least one memory and the computer program code are further configured, with the at least one processor, to cause the apparatus to perform at least the following: when first information indicating a presence of in-device co-existence interference is received and when no second information indicating the presence of in-device co-existence interference is received within a given period of time after receiving the first information, determining that the device is no longer experiencing in-device co-existence interference.

* * * * *